(12) United States Patent
Braedt et al.

(10) Patent No.: US 9,944,350 B2
(45) Date of Patent: Apr. 17, 2018

(54) CHAIN GUIDE SENSOR AND METHODS OF CONTROLING A BICYCLE

(71) Applicant: SRAM, LLC, Chicago, IL (US)

(72) Inventors: Henrik Braedt, Gebrunn (DE); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 107 days.

(21) Appl. No.: 14/992,651

(22) Filed: Jan. 11, 2016

(65) Prior Publication Data

US 2017/0197685 A1    Jul. 13, 2017

(51) Int. Cl.
| | |
|---|---|
| *B62M 9/122* | (2010.01) |
| *B62M 9/124* | (2010.01) |
| *G01B 7/30* | (2006.01) |
| *B62M 9/121* | (2010.01) |
| *B62J 99/00* | (2009.01) |

(52) U.S. Cl.
CPC .......... *B62M 9/122* (2013.01); *B62M 9/121* (2013.01); *B62M 9/124* (2013.01); *G01B 7/30* (2013.01); *B62J 2099/002* (2013.01); *B62K 2207/00* (2013.01)

(58) Field of Classification Search
CPC .......... G01B 7/30; B62M 9/122; B62M 9/124
See application file for complete search history.

(56) References Cited

U.S. PATENT DOCUMENTS

| | | |
|---|---|---|
| 4,925,201 A | 5/1990 | Leonard |
| 5,470,277 A | 11/1995 | Romano |
| 5,538,477 A | 7/1996 | Bellio et al. |
| 5,728,017 A | 3/1998 | Bellio et al. |
| 5,730,030 A | 3/1998 | Masui |
| 5,799,539 A | 9/1998 | Haase |
| 5,802,923 A | 9/1998 | Hara |
| 5,865,454 A | 2/1999 | Campagnolo |
| 6,047,230 A | 4/2000 | Spencer et al. |
| 6,467,786 B2 | 10/2002 | Horiuchi |
| 6,682,087 B1 | 1/2004 | Takeda |
| 6,698,307 B2 | 3/2004 | Wesling et al. |
| 6,774,771 B2 | 8/2004 | Takeda |
| 6,834,876 B2 | 12/2004 | Fukuda |
| 6,866,279 B2 | 3/2005 | Fujii |
| 6,884,190 B2 | 4/2005 | Takebayashi |
| 6,931,958 B2 | 8/2005 | Takeda |
| 6,959,941 B2 | 11/2005 | Takeda |
| 7,007,785 B2 | 3/2006 | Uno et al. |
| 7,285,064 B2 | 10/2007 | Ichida et al. |
| 7,373,232 B2 | 5/2008 | Guderzo |
| 7,383,103 B2 | 6/2008 | Guderzo et al. |

(Continued)

FOREIGN PATENT DOCUMENTS

| | | |
|---|---|---|
| EP | 1591355 A2 | 11/2005 |
| EP | 2093141 A1 | 8/2009 |

*Primary Examiner* — William E Dondero
*Assistant Examiner* — Robert T Reese

(57) ABSTRACT

A gear change mechanism for a bicycle may involve a tensioner that has a wheel engaged with a chain in a bicycle drivetrain. This tensioner may be configured to rotate or otherwise change orientation in response to slack in the chain to maintain tension in the chain. A sensor may be used to measure the orientation of a tensioner of a chain in a bicycle drivetrain, and/or the physical orientation of components indicative thereof. Actions may be triggered by signals generated by the sensor.

22 Claims, 14 Drawing Sheets

(56) References Cited

U.S. PATENT DOCUMENTS

| | | |
|---|---|---|
| 7,399,244 B2 * | 7/2008 | Takebayashi .......... B62M 25/08 474/70 |
| 7,434,489 B1 | 10/2008 | Scranton |
| 7,614,971 B2 | 11/2009 | Fujii et al. |
| 7,630,810 B2 | 12/2009 | Guderzo |
| 7,779,724 B2 | 8/2010 | Fujii |
| 7,854,180 B2 | 12/2010 | Tetsuka |
| 7,900,946 B2 | 3/2011 | Hara et al. |
| RE43,562 E | 7/2012 | Takeda et al. |
| 8,235,408 B2 | 8/2012 | Watarai |
| 8,297,143 B2 | 10/2012 | Fujii et al. |
| 8,744,699 B2 | 6/2014 | Yamaguchi et al. |
| 2003/0038625 A1 | 2/2003 | Guderzo |
| 2003/0100392 A1 | 5/2003 | Ichida |
| 2003/0160420 A1 | 8/2003 | Fukuda |
| 2004/0112161 A1 | 6/2004 | Takamoto |
| 2004/0239489 A1 | 12/2004 | Takeda |
| 2005/0029031 A1 | 2/2005 | Thomas |
| 2005/0223840 A1 | 10/2005 | Takamoto |
| 2005/0253356 A1 | 11/2005 | Matsueda et al. |
| 2006/0022425 A1 | 2/2006 | Nishimoto |
| 2007/0137361 A1 | 6/2007 | Fujii |
| 2009/0031841 A1 | 2/2009 | Tetsuka |
| 2009/0038427 A1 | 2/2009 | Watarai |
| 2009/0098963 A1 | 4/2009 | Watarai et al. |
| 2010/0170753 A1 | 7/2010 | Castro |
| 2010/0244401 A1 | 9/2010 | Hara et al. |
| 2013/0061705 A1 | 3/2013 | Jordan |
| 2014/0087901 A1 | 3/2014 | Shipman |

* cited by examiner

US 9,944,350 B2

1

CHAIN GUIDE SENSOR AND METHODS OF CONTROLING A BICYCLE

BACKGROUND OF THE INVENTION

A traditional bicycle may involve the use of a combination of different sized gears, sprockets, and/or cogs, in combination with a chain oriented thereon, to provide for a range of gearing for a rider. The chain is generally guided to the various gearing combinations by a gear change mechanism, such as one or more derailleurs.

An indication of the state of a gear combination and/or general engagement of the chain may be needed to provide information for an electronic, mechanical, and/or electromechanical shift operation of the one or more derailleurs. In a mechanical system a rider may be required to visually identify a gear combination and/or general engagement of the chain by looking at the particular sprockets that are engaged or not engaged. Alternatively, in an electrical and/or electromechanical system the gear combination and/or general engagement of the chain may be inferred or implied based on a measured output or orientation of a motor shaft, or an elapsed time since a shift command was provided to a motor. These techniques may be inconvenient and/or not provide an accurate indication of the actual orientation of the chain due to missed shift actions or other error events that may occur in bicycle transmission systems.

SUMMARY

In an embodiment, a gear change mechanism for a bicycle operated with a plurality of sprockets is driven by a chain. The gear change mechanism includes a base member configured for mounting to the bicycle. The gear change mechanism also includes a link mechanism pivotably connected to the base member. The gear change mechanism also includes a moveable member pivotably mounted to the link mechanism such that the moveable member is movable in an axial direction relative to the base member, a chain guide configured to engage and guide the chain, and a sensor configured to determine an angle of the chain guide relative to the moveable member.

In an embodiment a method of drivetrain management for a bicycle driven by a chain operating over a plurality of sprockets involves determining, with a sensor, an angle of a tensioner chain contact, the tensioner chain contact configured to maintain a tension in the chain, and detecting, by a processor in communication with the sensor, a change in the angle of the tensioner chain contact.

In an embodiment, a chain tensioner for a bicycle operated with a plurality of sprockets driven by a chain includes a tensioner mount configured to be attached to a bicycle, a pivot member rotatably mounted to the tensioner mount and configured to rotate about a first axis of rotation, and a chain interface structure. The chain interface structure may include an interface component configured to maintain contact with the chain, and a positioning member extending between and connecting the pivot member and the interface component. The chain tensioner may also include a biasing device coupled with the chain interface structure and configured to maintain a tension in the chain, and a sensor configured to determine an angle of the interface structure relative to the tensioner mount.

2

Figure 1:
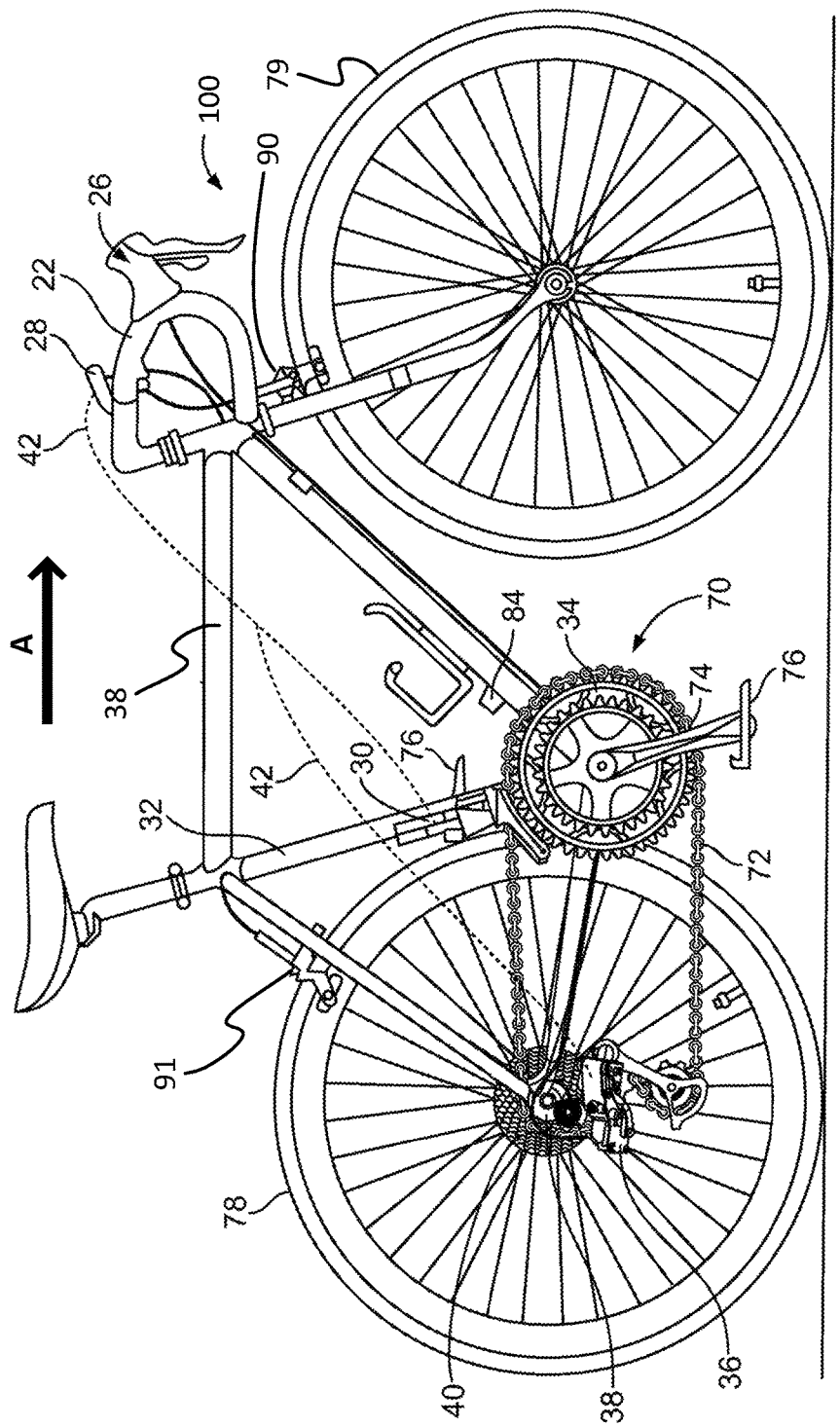
FIG. 1 is a side view of a bicycle, which may be used to employ a chain guide angle sensor.
Figure 2:
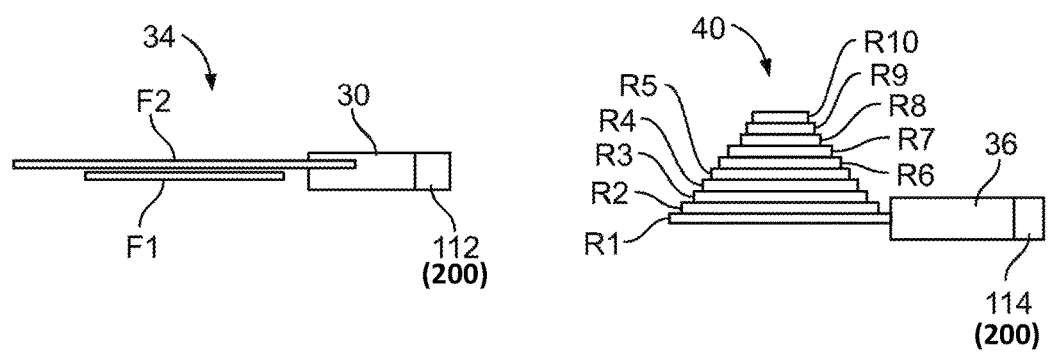
Figure 3:
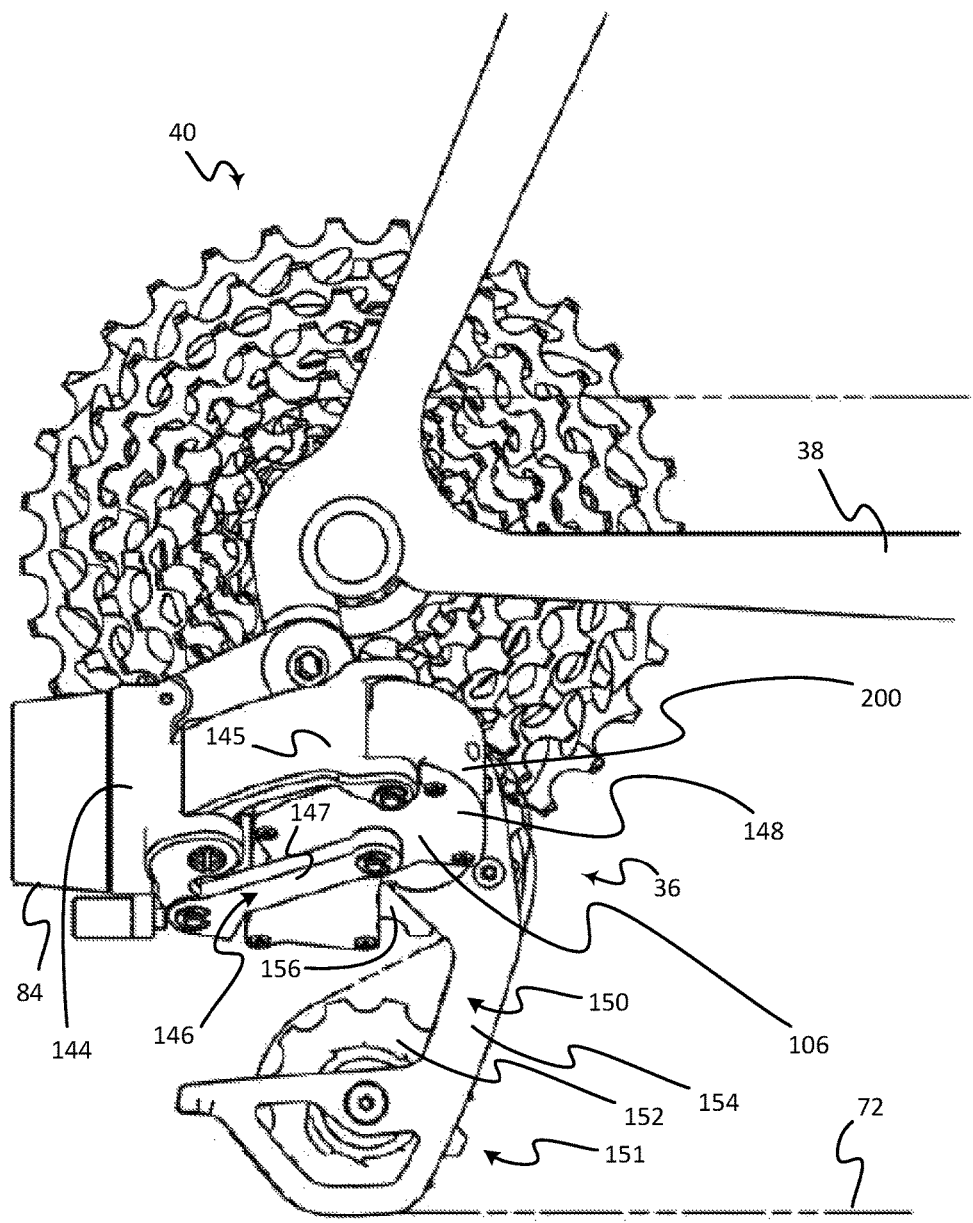
Figure 4A:
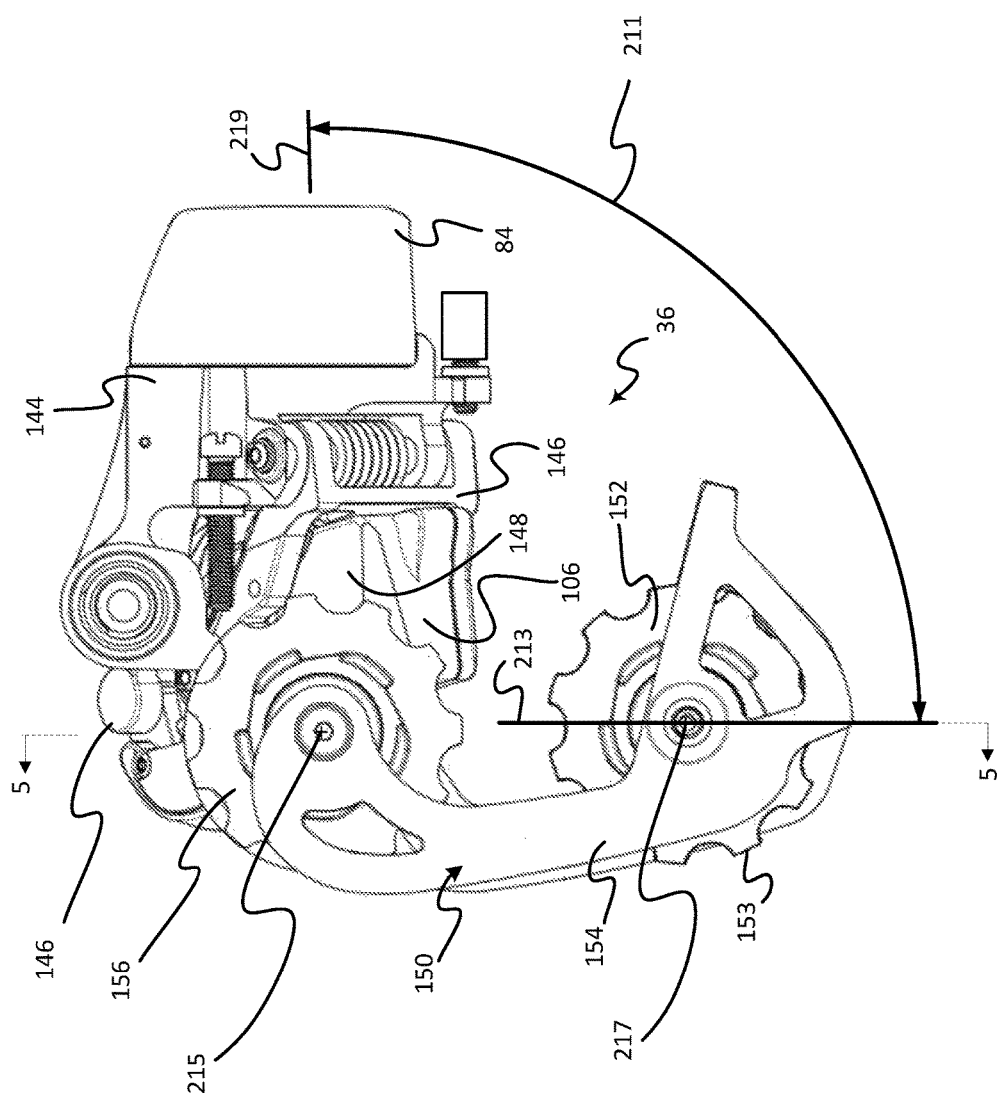
Figure 4C:
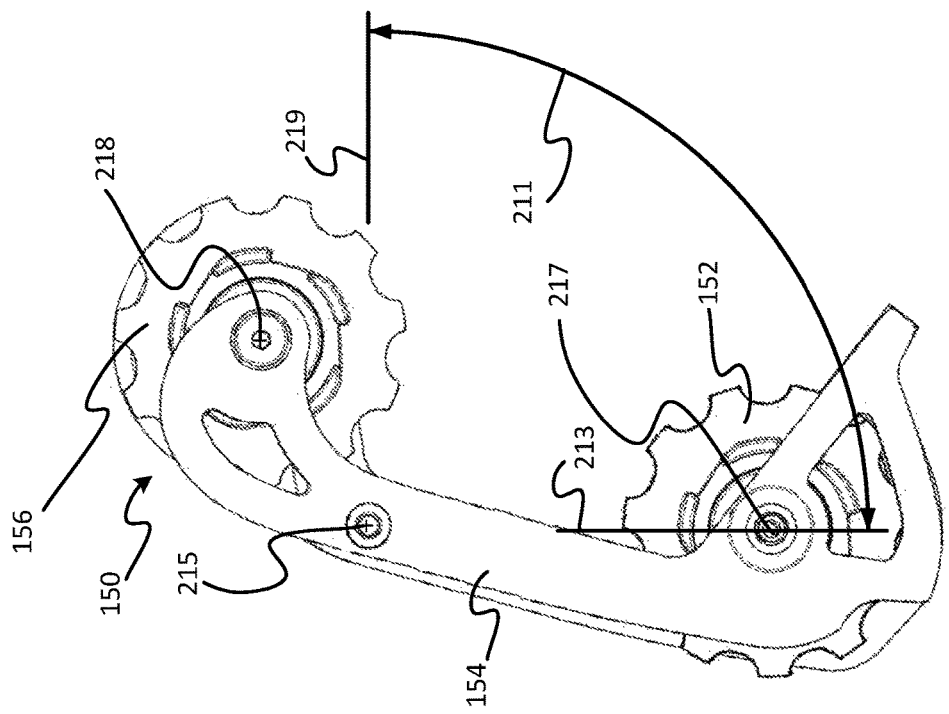
Figure 4B:
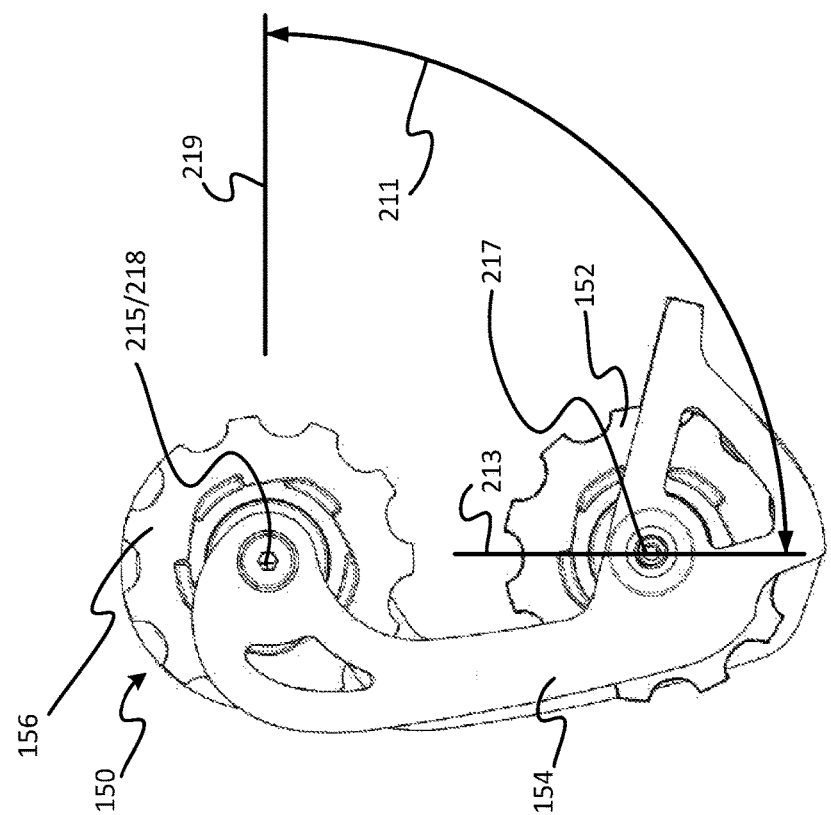
Figure 5:
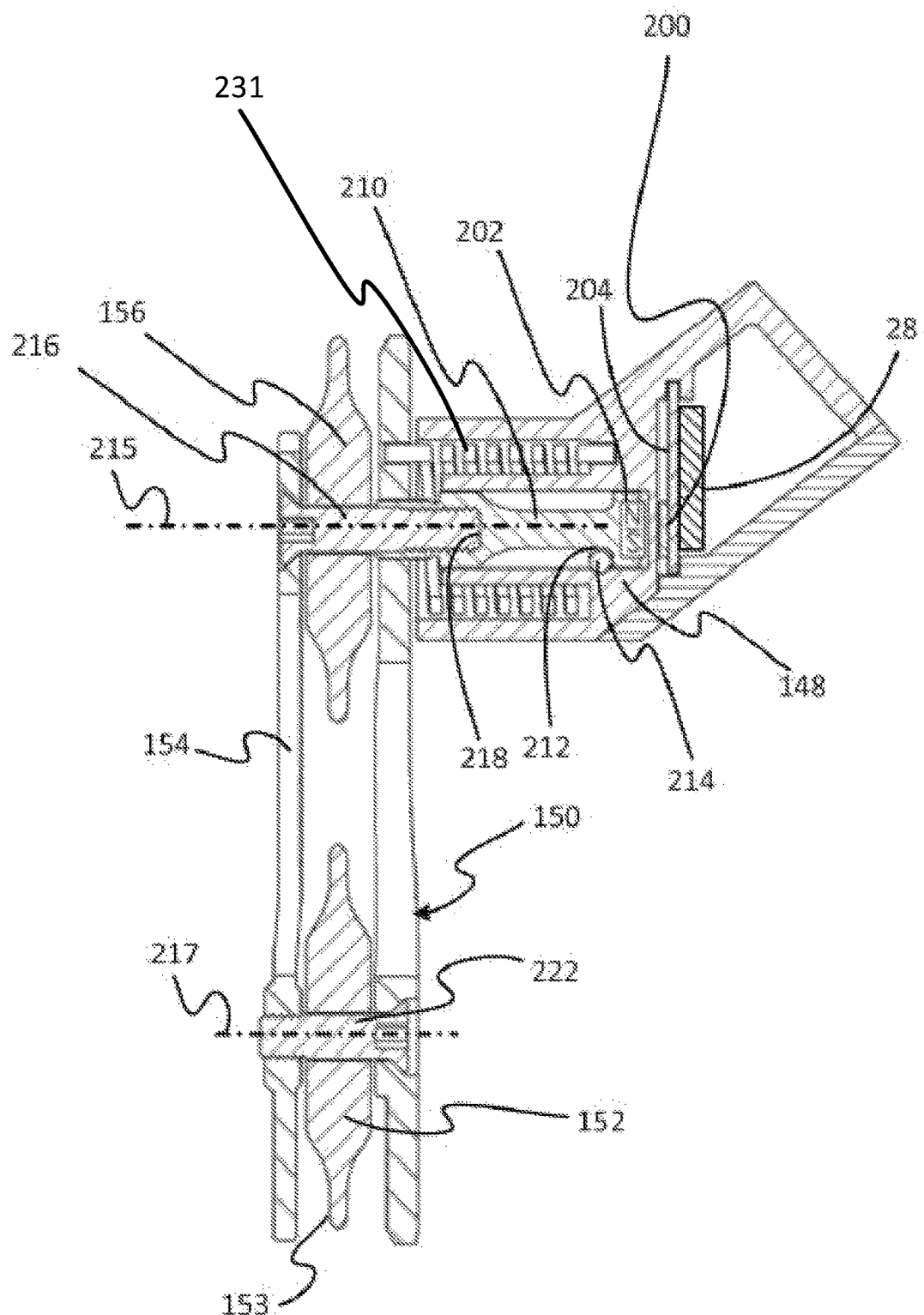
Figure 7:
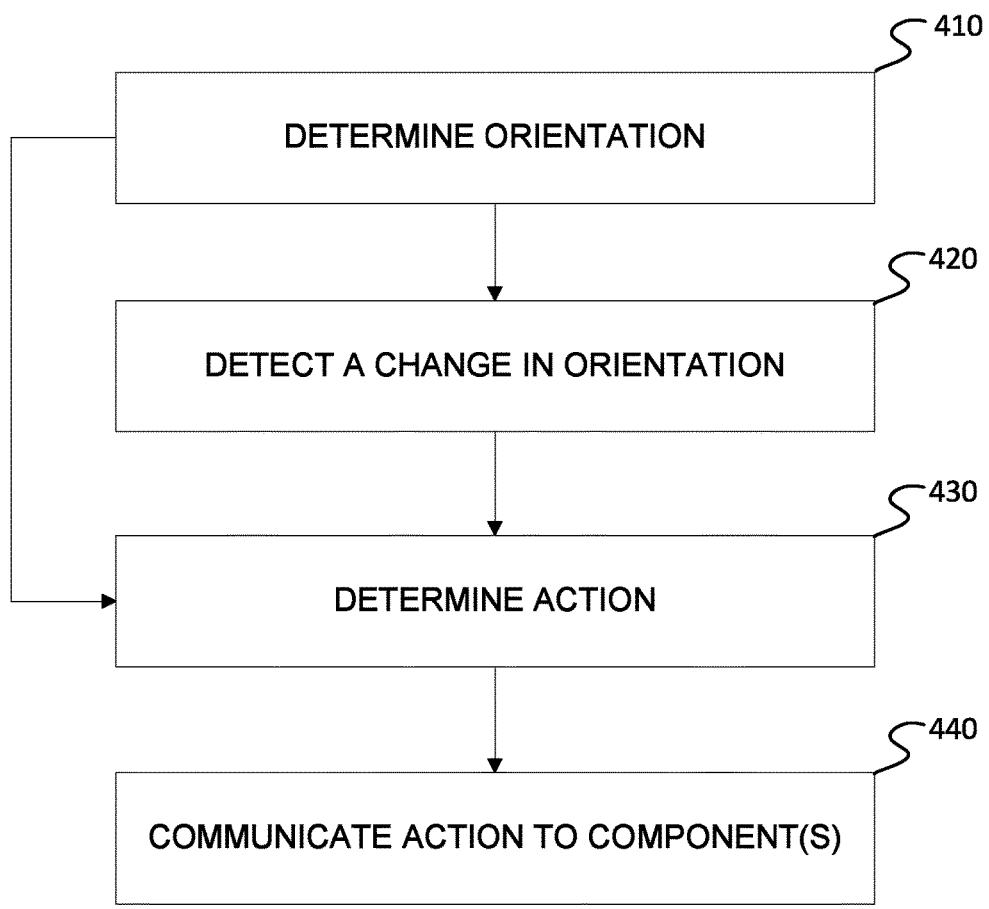
Figure 10:
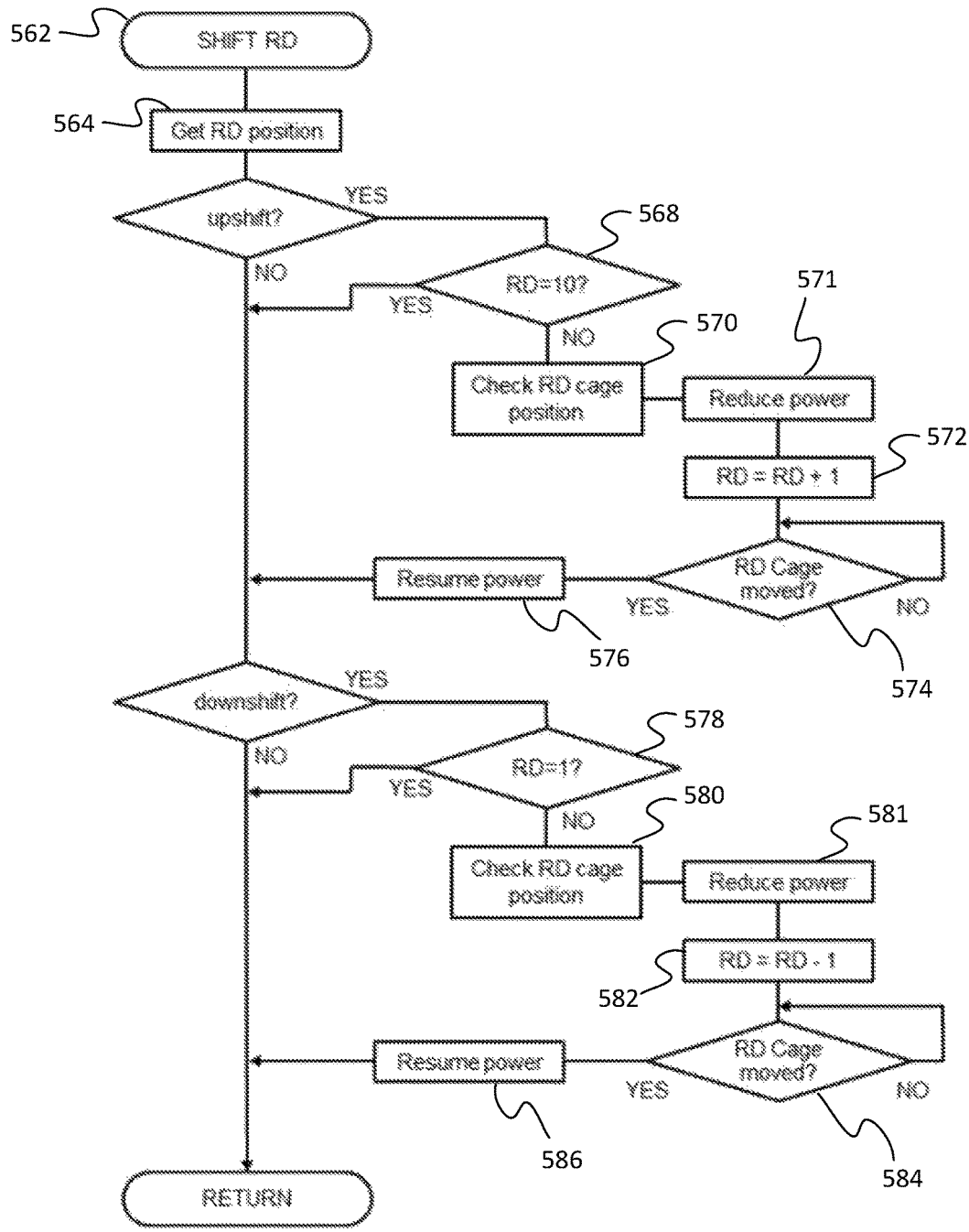
Figure 11:
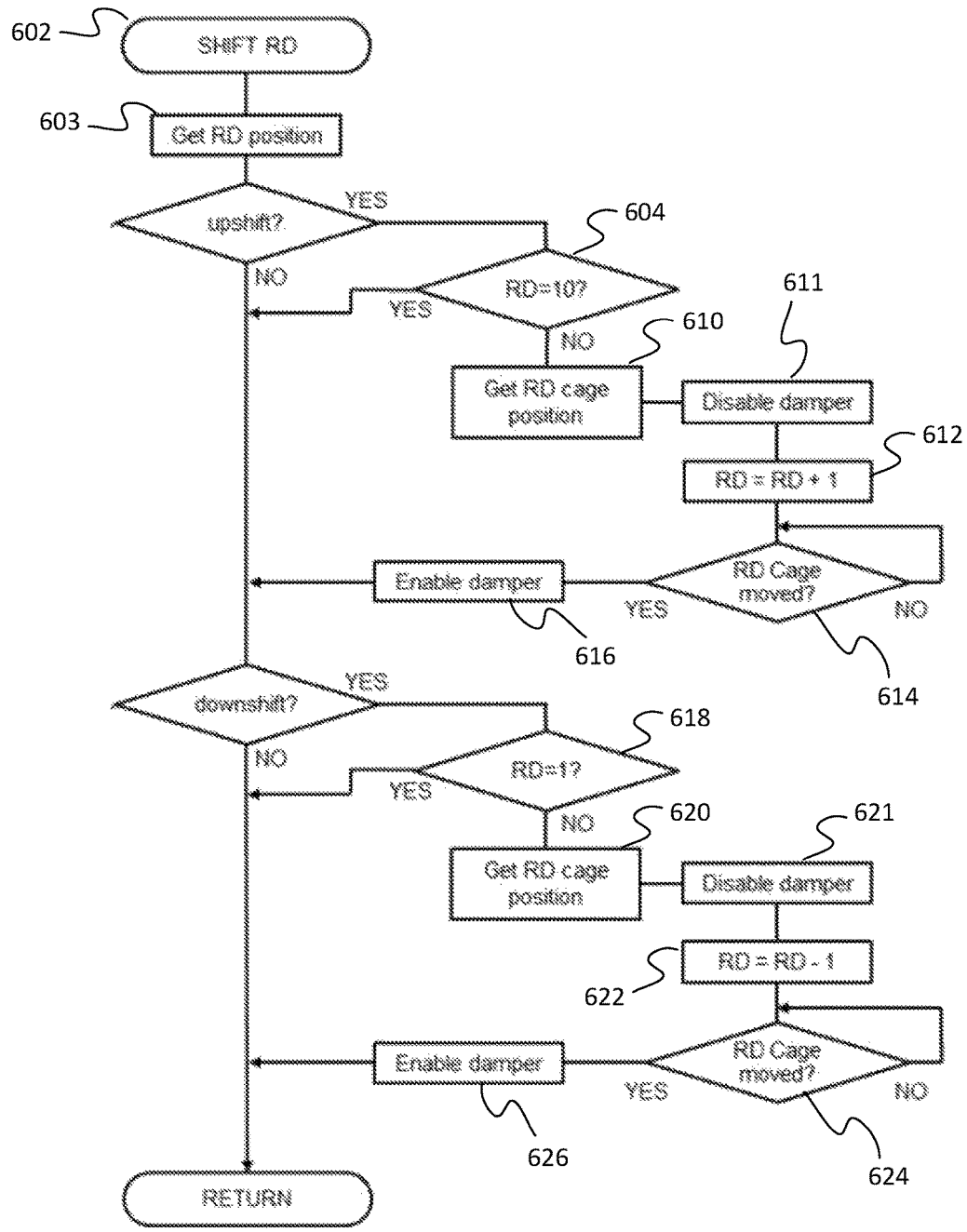
Figure 12:
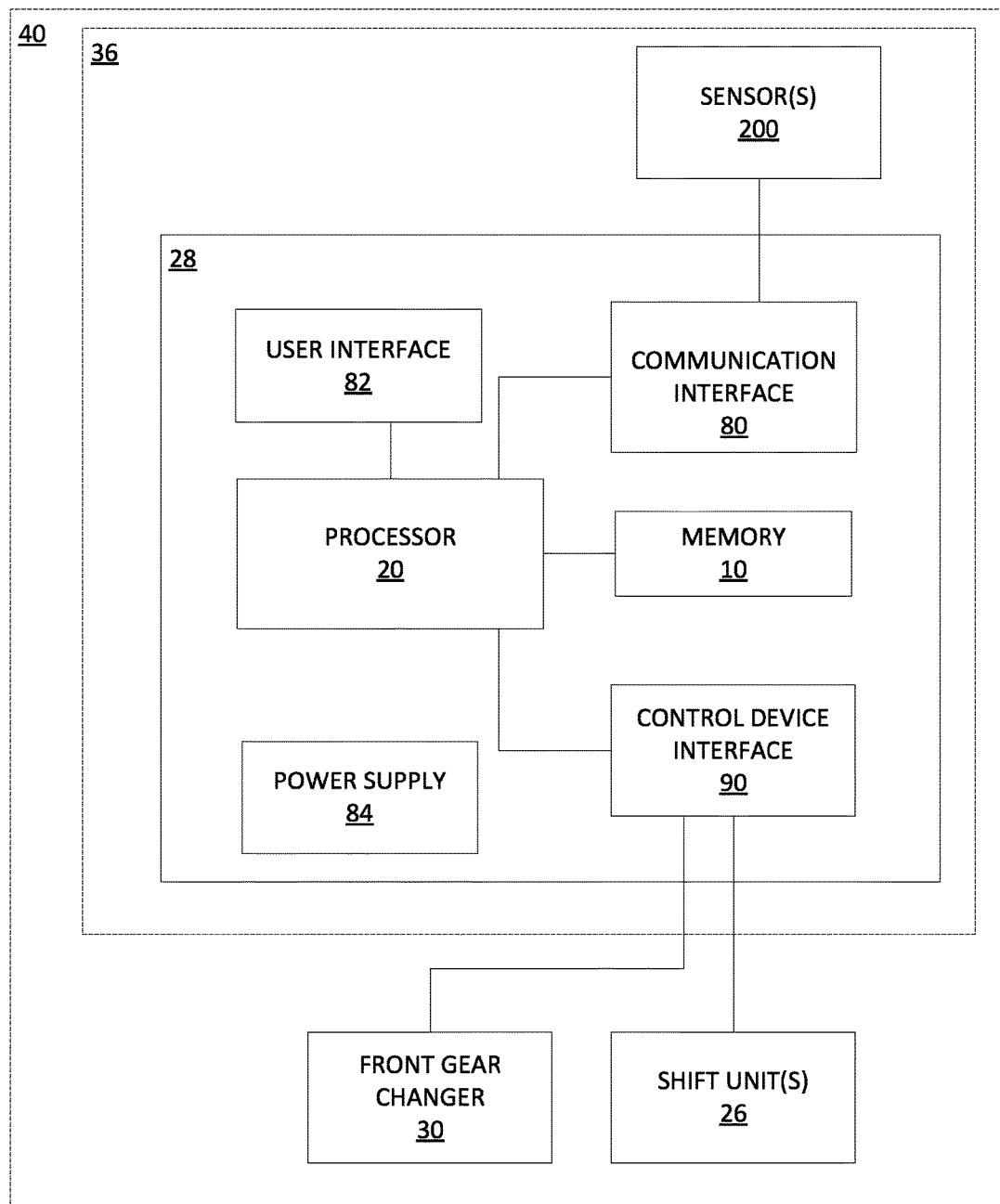

FIG. 2 illustrates cogs of a drivetrain, such as the drivetrain for the bicycle of FIG. 1;

FIG. 3 is a side view of a rear gear changer, such as the rear gear changer of FIG. 1;

FIG. 4A is a side view of the gear changer of FIG. 3, from an opposing perspective;

FIGS. 4B-C illustrate chain guides that may be used with the gear changer of FIG. 3, from the opposing perspective of FIG. 4A;

FIG. 5 is a cross sectional view of a chain guide and moveable member of the rear gear changer of FIG. 4A, with which an angle sensor may be implemented;

FIGS. 6A-6D illustrate various chain configurations for the bicycle drivetrain of FIG. 2;

FIG. 7 is a flowchart diagram of a method of controlling a bicycle;

FIGS. 8-11 are flowchart diagrams of embodiments for methods of controlling a bicycle; and FIG. 12 is a block diagram of an embodiment of a control unit.

Other aspects and advantages of the embodiments disclosed herein will become apparent upon consideration of the following detailed description, wherein similar or identical structures have similar or identical reference numerals.

DETAILED DESCRIPTION

Different gearing combinations and/or chain engagements may involve different chain lengths and tensions, as the gearing combinations involve various sizes of gears and/or sprockets. Tension is maintained in the chain through the different chain lengths through a tensioning device, which may be integrated with a gear change mechanism, such as a derailleur. The tensioning device is configured to interact directly with the chain, such as with a wheel that engages the chain. The orientation of the tensioning device may be indicative of particular gearing combinations and/or chain engagements.

A sensor may be used to measure the orientation of the tensioner, and/or the physical orientation of components indicative thereof. For example, a gear change mechanism for a bicycle may involve a tensioner that has a wheel engaged with the chain. This tensioner may be configured to rotate or otherwise change orientation in response to slack in the chain to maintain tension in the chain. As such, the orientation of the wheel, as may be indicated by a specific angle of rotation of the tensioner device, is indicative of the current length of chain required to engage the current combination of gears. Therefore, this orientation and/or angular measure, or changes therein, indicate the specific current gearing combination of the chain. Further, if the chain loses engagement with the gearing combinations, such as by a dropped or broken chain, the orientation and/or angular measure will indicate this chain state as well.

Signals of the orientation and/or angle sensor may be used for various actions and/or activities. The signals may be communicated to a processor and/or controller to facilitate the actions and/or activities. For example, the signal may be interpreted by a controller to determine a specific current gearing configuration for the chain, and the controller may communicate commands to other components, such as motors and/or displays, to take actions based on the received signals from the orientation and/or angle sensor.

FIG. 1 generally illustrates a bicycle 100 with which one or more chain guide orientation and/or angle sensors may be used. The bicycle 100 includes a frame 38, front and rear wheels 79, 78 rotatably attached to the frame 38, and a drivetrain 70. A front brake 90 is provided for braking the front wheel 79 and a rear brake 91 is provided for braking the rear wheel 78. The front and/or forward orientation of the bicycle 100 is indicated by the direction of arrow "A." As such, a forward direction of movement for the bicycle is indicated by the direction of arrow A.

While the illustrated bicycle 100 is a road bike having drop-style handlebars 22, the present invention has applications to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems.

The bicycle 100 may include one or more shift units 26, mounted to the handlebars 22. One or more control units 28 may also be included, and is shown mounted to the handlebars 22. In other embodiments one or more control units may be integrated with other bicycle components, and a stand-alone control unit may or may not be provided. A front gear changer or front gear shift mechanism 30, such as a front derailleur, may be positioned on the seat tube 32 adjacent the front sprocket assembly 34 so as to effect gear changes to the front sprockets or an associated structure. A rear gear changer or rear gear shift mechanism 36, such as a rear derailleur, is mounted to a member of the frame 38 of the bicycle, such as a mount, rear dropout, and/or an associated structure, in a position to effect gear changes in a rear sprocket assembly 40. A communication link 42 may be provided between the control unit 28, the shift units 26, the front gear changer 30, the rear gear changer 36, or any combination thereof Alternatively, no stand-alone control unit 28 is provided and the shift units 26 communicate with the front gear changer 30 and/or the rear gear changer 36 directly using the communication link 42, or other means. As such, one or more control units 28, or components thereof, may be integrated with the shift units 26, the front gear changer 30, the rear gear changer 36, or any combination thereof. The system may also be applied, in some embodiments, to a bicycle where only a front or only a rear gear changer is used.

The control unit 28 is shown mounted to the handlebar 22, but could be located anywhere on the bicycle 24 or, alternatively, control unit 28 components may be distributed among the various components with routing of the communication link 42 to accommodate the necessary signal and power paths. It would also be possible to locate the control unit 28 other than on the bicycle, for example on the user's wrist or in a jersey pocket. The communication link 42 could include wires or be wireless, or be a combination thereof. In an embodiment, the control unit 28 is integrated with some or all of the shift units 26, the front gear changer 30, and the rear gear changer 36 to communicate control commands between components. The control unit 28 may include a processor, a memory, and one or more communication interfaces, for example as is described further below with respect to FIG. 12. More or fewer components may be included in the control unit 28.

The drivetrain 70 comprises a chain 72, the front sprocket assembly 34, which is coaxially mounted with a crank 74 having pedals 76, and the front gear change mechanism 30, such as a derailleur which may be electrically controlled. The drivetrain also includes the rear sprocket assembly 40 coaxially mounted with the rear wheel 78, and the rear gear change mechanism 36, such as a rear derailleur that may be electrically controlled.

As is illustrated in FIG. 2 (and also referring to FIG. 1) the front sprocket assembly 34 may include two coaxially mounted chain rings, gears or sprockets F1-F2, and rear sprocket assembly 40 may include ten gears, cogs or sprockets R1-R10. The number of teeth on front sprocket F1 is preferably less than the number of teeth on sprocket F2. The rear sprocket assembly 40 may include rear sprockets R1-R10. The numbers of teeth on rear sprockets R1-R10 typically gradually decrease from rear sprocket R1 to sprocket R10. Front gear changer 30 moves from a first operating position to a second operating position to move the chain 72 between sprockets F1 and F2, and the rear gear changer 36 moves between ten operating positions to switch the chain to one of rear sprockets R1-R10. Preferably, a front gear position sensor 112 is used to sense the operating position of the front gear changer 30, and a rear gear position sensor 114 is used to sense the operating position of the rear gear changer 36. Position sensors 112, 114 may comprise rotary encoders, potentiometers, or other devices capable of sensing position in a gear change mechanism. The position sensors 112, 114 may be any sensor, or combination of sensors, operable to provide information relating to the target gearing combination and/or chain engagement. In an embodiment, the position of a tensioner integrated with a gear change mechanism is determined relative to other components of the gear change mechanism. For example an angle of a chain guide rotatable relative to a horizontal or other reference may be determined by a position sensor, such as the sensor 200 of FIG. 5. In an embodiment one or both of the position sensors 112, 114 may be the angle sensor 200. In another embodiment, the position sensors 112, 114 may be used in addition to the angle sensor 200.

As is shown in FIG. 3 with respect to the rear gear changer 36, a power supply 84, such as one or more batteries and/or another power source, may power the rear and/or front gear changers 36, 30 as well as other electric components within the system. The power supply 84 may also be located in other positions, such as attached to the frame 38 as shown in FIG. 1. Further, multiple power supplies may be provided, which may collectively or individually power the electric components of the system, such as a drive motor for an embodiment involving an electrically powered bicycle. In an embodiment, a battery 84 may be configured to be attached directly to a rear derailleur, and provide power only to the components of the derailleur, as is indicated in FIGS. 3 and 4.

FIGS. 3 and 4A show the rear gear changer 36. The rear gear changer 36 preferably includes a base member 144 mounted to the bicycle frame 38, a linkage or link mechanism 146 pivotably connected to the base member 144, and a movable member 148 pivotably mounted to the link mechanism 146 so that the movable member 148 moves laterally relative to the base member in accordance with the operation of a motor. The link mechanism 146 may include any number of links, for example two links may be used. In such an embodiment, the link mechanism 146 may be configured such that the base member 144 functions as one bar of a four-bar linkage. The linkage includes a first link 145 and a second link 147, which are each pivotally connected to base member 144 and make up two more of the four bars in the linkage. The moveable member 148 completes the four-bar linkage by pivotally connecting to the first link and the second link.

The movable member 118 may house the motor and gear mechanism 106 or transmission. The motor and gear mechanism 106 may be coupled with the link mechanism 146 to provide movement of the movable member 148. Movable member 148 pivotably supports a chain interface structure, such as a chain guide 150, so that lateral movement of the movable member switches the chain 72 among the rear sprockets 40 (R1-R10).

The chain guide 150 may include a tensioning device 151 or tensioner that includes a tensioner chain contact such as a wheel 152 or a tensioner wheel, which may be placed in contact with the chain 72. The wheel 152 may have one or more teeth 153 configured to interact with the chain such that the wheel 152 rotates as the teeth 153 move with the chain. The wheel 152 may be configured to rotate about a wheel rotational axis 217 to maintain the chain interaction. The wheel 152 may be configured to rotate about two different axis of rotations. The wheel 152 and/or wheel rotational axis 217 may be distanced from a tensioner, or pivot, rotational axis 215 by a positioning member, which may be a rigid member 154 such as a cage member, of the chain guide 150, as such, the tensioner rotational axis 215 may be a first axis of rotation and the wheel rotational axis 217 may be a second axis of rotation. The rigid member may be biased by a biasing device 231, such as a spring shown in FIG. 5, to maintain tension in the chain through the wheel contact 152. The chain guide 150 may also include a second wheel 156, such as a guide wheel, that is a rotatably attached component of the chain guide 150. The second wheel 156 is configured to interact with the chain and direct the chain to the various sprockets of the rear sprocket assembly 40. The position of the second wheel 156 may be based on a position of the moveable member 148.

FIGS. 4B and 4C illustrate chain guides 150 that may be used with the angle and/or orientation sensor as described herein. The second wheel 156 of the chain guide 150 may be configured such that the tensioner axis 215 is the axis of rotation 218 for the second wheel 156, as is illustrated in FIG. 4B. In alternate embodiments, the second wheel 156 may operate on a third rotational axis which is an axis of wheel rotation 218 that is separate and distinct from the tensioner axis 215, such as is illustrated in FIG. 4C. In these embodiments, the second wheel will be located a distance away from the tensioner axis 215 and rotate about both the tensioner axis 215 and this separate and distinct axis of wheel rotation 218. The distance separating the first wheel rotational axis 217 from the tensioner axis 215 and the distance separating the second wheel rotational axis 218 from the tensioner axis may be the same or different. For example, in an embodiment, as is shown in FIG. 4C, the distance separating the first wheel rotational axis 217 from the tensioner axis 215 is larger than the distance separating the second wheel rotational axis 218 from the tensioner axis.

The movable member 148 may also have attached and/or house a sensor 200, such as an angle sensor, configured to determine an orientation and/or angle of the chain guide 150 relative to the movable member 148. The sensor 200 may be fixably mounted to the movable member 148, as is shown in FIG. 5, or in other configurations. For example, the sensor 200 may be disposed on the chain guide 150 and/or the frame 38. The output of the sensor 200 may be any output operable to provide a signal indicative of the determined angle. For example, the output may be a raw measureable physical reading, such as a voltage, which may be communicated as an output signal. In an embodiment, the sensor 200 may include an encoder configured to translate the physical reading into a coded value, such as binary value, which may be communicated as an output signal. For example, the signal may be communicated as an 8-bit binary value that indicates the angle.

The orientation and/or angle of the chain guide 150 may be determined based on an angle of the chain guide 150 relative to a reference plane 219. The reference plane 219 may be any reference plane operable to provide a consistent reference for a relative orientation of the chain guide 150. In an embodiment, the reference plane 219 is at a fixed orientation relative to the moveable member 148. For example, the reference plane 219 may be a horizontal plane fixed relative to the moveable member 148 such that the reference plane 219 and the moveable member 148 move together when the moveable member 148 is moved. As such, an angle of the chain guide 150 relative to the reference plane 219 is an angle of the chain guide 150 relative to the moveable member 148. In an embodiment, the orientation and/or angle of the chain guide 150 may further be defined by the angle of rotation 211 from the reference plane 219 to a line 213 drawn between the tensioner axis 215 through the tensioner wheel rotational axis 217.

FIG. 5 illustrates a sectional view of the moveable member 148, a pivot member 210, and the chain guide 150 of the rear derailleur 36 of FIGS. 1-4 taken at 5-5 . The moveable member 148 is a pivot or tensioner mount. As shown in FIG. 5, the sensor 200 is disposed in and/or on the moveable member 148 and detects the rotational orientation of a magnet 202 mounted on an end 212 of a pivot or pivot member 210. The pivot member 210 is pivotably mounted to the movable member 150, and fixably mounted to the chain guide 150. For example, a pin 214, clip, and/or other attachment device may connect the moveable member 148 to the pivot member 210 through an annular slot 212 formed around and/or in the pivot member 210. As such, the pivot member 210 and attached chain guide 150 can rotate about the pivot axis 215 relative to the moveable member 148. Also, the pivot member 210 may be fixably attached to the chain guide 150 through any technique. For example, the pivot member 210 may be attached to the chain guide 150 through an interference, press-fit, adhesive based, or other assembly technique. The sensor 200 can measure an angle of rotation 211 of the pivot member 210, and consequently the attached chain guide 150, by measuring the orientation and/or angle of the magnet 202 relative to the sensor 200 that remains stationary and fixed to the movable member 148 relative to the pivot member 210.

The sensor 200 may be communicatively coupled and/or affixed to a printed circuit board 204 or other material which may in turn be secured to the moveable member 148. The printed circuit board 204 and/or the moveable member 148 may be configured such that the sensor 200 is aligned within a sensing range of the magnet 202 when the magnet is disposed on the pivot member 210. The circuit board 204 may contain other processing and/or communication circuitry as is described herein, for example with respect to FIG. 12. As such, the sensor 200 and/or the printed circuit board 204 may be configured to communicate with a control unit located external and/or independent of the moveable member 148 and/or the rear derailleur. Alternatively, the sensor 200 and/or printed circuit board 204 may be configured to communicate with a control unit 28 located on or in the moveable member 148, as is shown in FIG. 5. For example, a control unit 28 may be connected to, or installed on, the moveable member 148, and the sensor 200 may be communicatively coupled to the control unit 28 such that signals indicative of the orientation and/or angle of the chain guide are communicated between the sensor 200 to the control unit 28. The control unit 28 may be a control unit specifically configured to control the rear derailleur and/or communicate with other components of the bicycle. For example, the control unit 28 may be configured to provide commands and/or instructions to a motor coupled with a linkage or link mechanism configured to move the moveable member 148, as is described with respect to FIGS. 3 and 4A. The sensor may alternatively, or additionally, be configured to communicate with control units located external to the moveable member and/or the rear derailleur.

In an embodiment, the pivot member 210 and a chain interface structure, such as the chain guide 150, may be attached to a pivot or tensioner mount without being attached to a derailleur. For example, the pivot mount may be attached to a frame of a bicycle, and be configured to interact with a chain of the bicycle to maintain a tension in the chain, as is described herein. The sensor 200 may be configured to determine an angle of the chain interface structure 150 as is described herein with respect to tensioner mechanisms and/or chain guides attached to derailleurs.

As shown in the embodiment illustrated in FIG. 5, the sensor 200 is a magnetic rotary encoder such as an AS5030 8-Bit Programmable High Speed Magnetic Rotary Encoder offered by AM AG, however, the sensor may be any type of sensor operable to provide an orientation or angle of the chain guide 150. For example, optical, mechanical, electromagnetic, capacitive, inductive, Doppler effect, radar, Eddy-current, laser, acceleration, thermal, Hall effect, gyroscopic, as well as other sensors, or combinations thereof, may be used.

The second wheel 156 may be rotatably secured by a pinion 216, such as a threaded screw or bolt, which is disposed co-axially with the pivot member 210 along the tensioner or pivot axis 215. In an embodiment, the pinion 216 may be threadably secured within a threaded vacancy or hole of the end of the pivot member 216. The tensioner wheel 152 may also be rotatably secured by a pinion 222, such as a screw or bolt, to the rigid member 154 such that the tension wheel rotates about the wheel rotation axis 217 which is positioned apart from the tensioner or pivot axis 215 by the rigid member 154.

FIGS. 6A-6D illustrate various orientations of the chain guide 150 for different configurations of the chain 72 on front and rear sprocket assemblies, such as the sprocket assemblies 34, 40 described with respect to FIG. 2, particularly with respect to the a first and second wheels 152, 156 of the chain guide. In this illustration, an orientation of the chain guide relative to a reference plane 219 is indicated as the angle of rotation 211, however, in other embodiments the orientation and/or angle of the chain guide may be determined from other references.

Figure 6A:
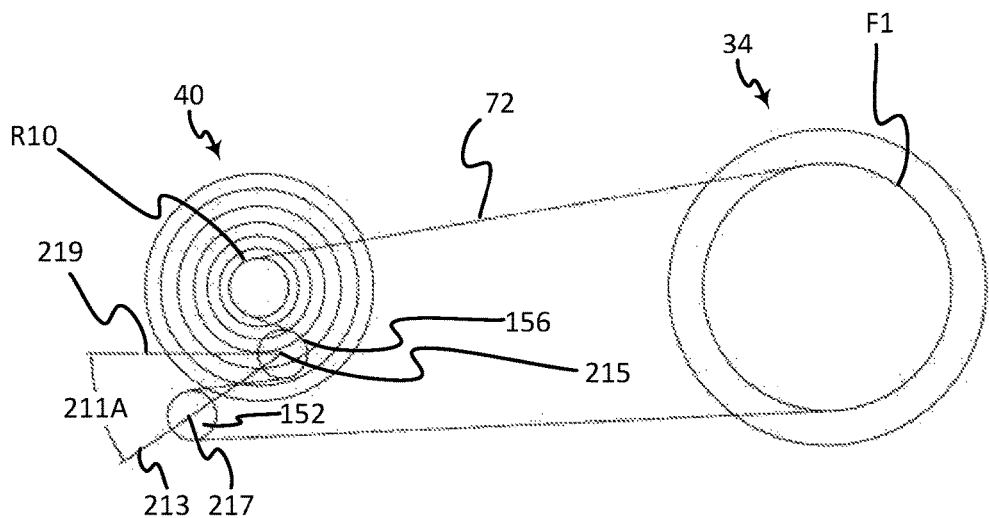
Figure 6B:
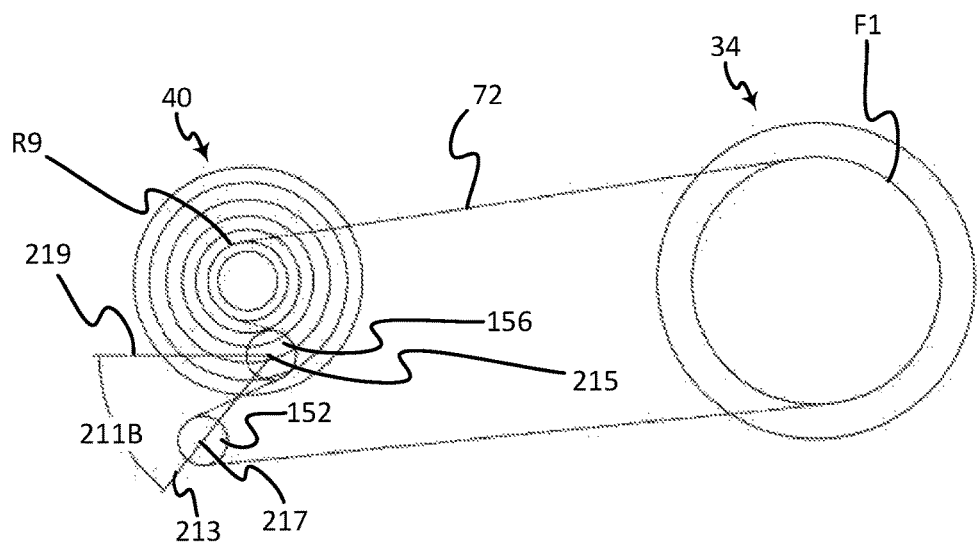
Figure 6C:
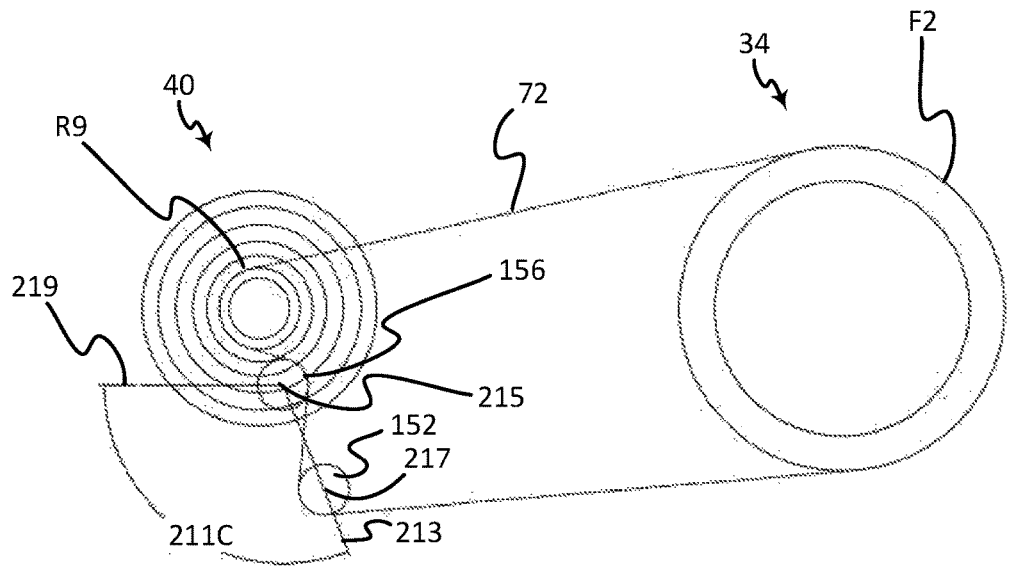
Figure 6D:
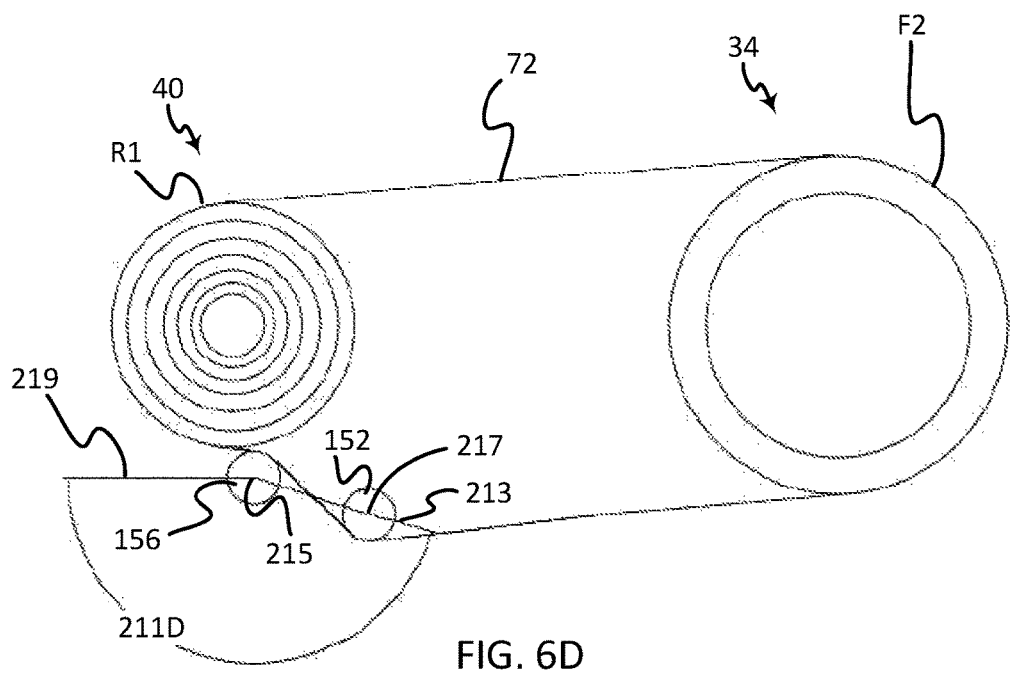

In FIG. 6A, the chain 72 is configured to interact with a smallest sprocket F1 of the front sprocket assembly 34, and with a smallest sprocket R10 of the rear sprocket assembly 40. This chain configuration results in a particular angle of the chain guide 211A. FIG. 6B shows that the chain is configured to interact with the smallest sprocket F1 of the front sprocket assembly 34, and a second smallest R9 sprocket of the rear sprocket assembly 40, which will result in a different angle of the chain guide 211B, which is different than the angle of the chain guide 211A in FIG. 6A. As such, a signal indicating an angle of the chain guide provided by an angle sensor as described herein may be used to determine the specific chain configuration (e.g. F1-R10 or F1-R9), or a change in a chain configuration (e.g. F1-R10 to F1-R9). FIG. 6C shows the chain 72 configured to interact with a different sprocket F2 of the front sprocket assembly 34, and with the second smallest sprocket R9 of the rear sprocket assembly 40. This chain 72 configuration results in another angle of the chain guide 211C, which is distinct from the angle of the chain guide of FIG. 6A 211A, and the angle of the chain guide 211B of FIG. 6B. FIG. 6D shows the chain 72 configured to interact with the different sprocket F2 of the front sprocket assembly 34, and with the largest sprocket R1 of the rear sprocket assembly 40. This chain 72 configuration results in another angle of the chain guide 211D, which is distinct from the angle of the chain guide 211A of FIG. 6A, the angle of the chain guide 211B of FIG. 6B, and the angle of the chain guide 211C of FIG. 6C. In this way, any particular orientation of the chain among front and rear sprockets may be determined based on a signal indicating the angle of the chain guide.

Table 1 provides approximate angles of rotation 211 for a chain guide for an example drivetrain for different configurations of front and rear cogs (e.g F1, F2 and R1-R10 of FIG. 2). In this example, the angles are indicated in degrees, and the number of teeth of each particular cog is indicated in parenthesis.

TABLE 1

| REAR COG | F1 (36) | F2 (52) |
|---|---|---|
| R1 (11) | 111° | 164° |
| R2 (12) | 90° | 139° |
| R3 (13) | 80° | 129° |
| R4 (14) | 71° | 120° |
| R5 (15) | 64° | 115° |
| R6 (17) | 57° | 109° |
| R7 (19) | 53° | 106° |
| R8 (22) | 49° | 102° |
| R9 (25) | 44° | 99° |
| R10 (32) | 40° | 96° |

As can be seen from Table 1, different combinations of front and rear cogs will yield distinct and detectable angle values of the chain guide. As such, a signal generated by a sensor configured to detect these angles may be indicative of the particular combination of front and rear cogs that are engaged by the chain.

A change in a signal indicating the orientation and/or angle of the chain guide may also, or alternatively, be detected, which may indicate a configurations, or change in a configuration, of a chain with the sprockets. For example, as the chain 72 moves from the a sprocket R10 as shown in FIG. 6A, to another sprocket R9 as shown in FIG. 6B, the signal indicating the orientation and/or angle of the chain guide will change as a result of the 4 degrees angle change. Such a change can be detected and used to trigger actions and/or other activities. Further, in an embodiment, the change in the signal may be a value, and this value may be compared to a change threshold to determine if the change should trigger actions and/or other activities. The threshold may be equivalent to an angle, such as 0.5 degrees, or based on an output signal, such as a voltage or coded value, provided by the sensor 200 to indicate the angular change. Further, the change may meet the threshold for a predetermined time, such as 500 ms, prior to triggering actions and/or other activities. Such thresholds may aid in avoiding errored angular readings do to sensor and/or system noise.

FIG. 7 illustrates a flow chart for a method of controlling bicycle components with an orientation and/or angle sensor, such as sensors configured as described herein. The acts may be performed using any combination of the components indicated in FIG. 12. For example the following acts may be performed by a processor 20. Additional, different, or fewer acts may be provided. The acts are performed in the order shown or other orders. For example act 410 and act 420 may be performed concurrently and/or alternatively. The acts may also be repeated.

In act 410, an orientation is determined. The orientation may be any orientation of a tensioner in contact with a chain engaged with a drivetrain of a bicycle. For example, the tensioner may be a tensioner integrated with a front or rear derailleur of the bicycle, as is described with respect to FIGS. 3 and 4. The orientation may be any orientation indicative of a configuration of the chain. For example, the orientation may be a rotated angle of the tensioner, relative to a reference plane. Such an orientation and/or angle may be determined and/or implied as a determined position of a tensioner chain contact that is configured to interface with, and/or maintain a tension in, the chain. The orientation may be determined using any technique. For example, the orientation may be determined with an angle sensor configured to determine an angle of a chain guide, as is described herein.

In act 420, a change in the orientation is detected. The change may be any change in orientation of the tensioner. For example, the angle of a chain guide including the tensioner may change relative to a reference. The change in orientation may be determined using any technique. For example, the change in orientation may be determined with an angle sensor configured to determine an angle of a chain guide, as is described herein.

In act 430, an action is determined. The action may be determined in response to the determined orientation and/or detected change in orientation. The action may be any action. For example, the action may be a shift action of a bicycle drivetrain control system.

In act 440, the action is communicated. The action may be communicated to components that will enact the action. For example, a shift action determined in response to the determined orientation and/or detected change in orientation may be communicated to a gear changer, such as a front and/or rear derailleur. In an embodiment, the action is communicated as a control signal to one or more electric motors, such as electric motors providing the motive force for the front and/or rear derailleur.

FIGS. 8-11 illustrate flow charts for methods that include actions taken in response to determined orientations and/or detected changes in orientations. The acts may be performed using any combination of the components indicated in FIG. 12. For example the acts may be performed by a processor 20. Additional, different, or fewer acts may be provided. The acts are performed in the order shown or other orders. The acts may also be repeated.

Figure 8:
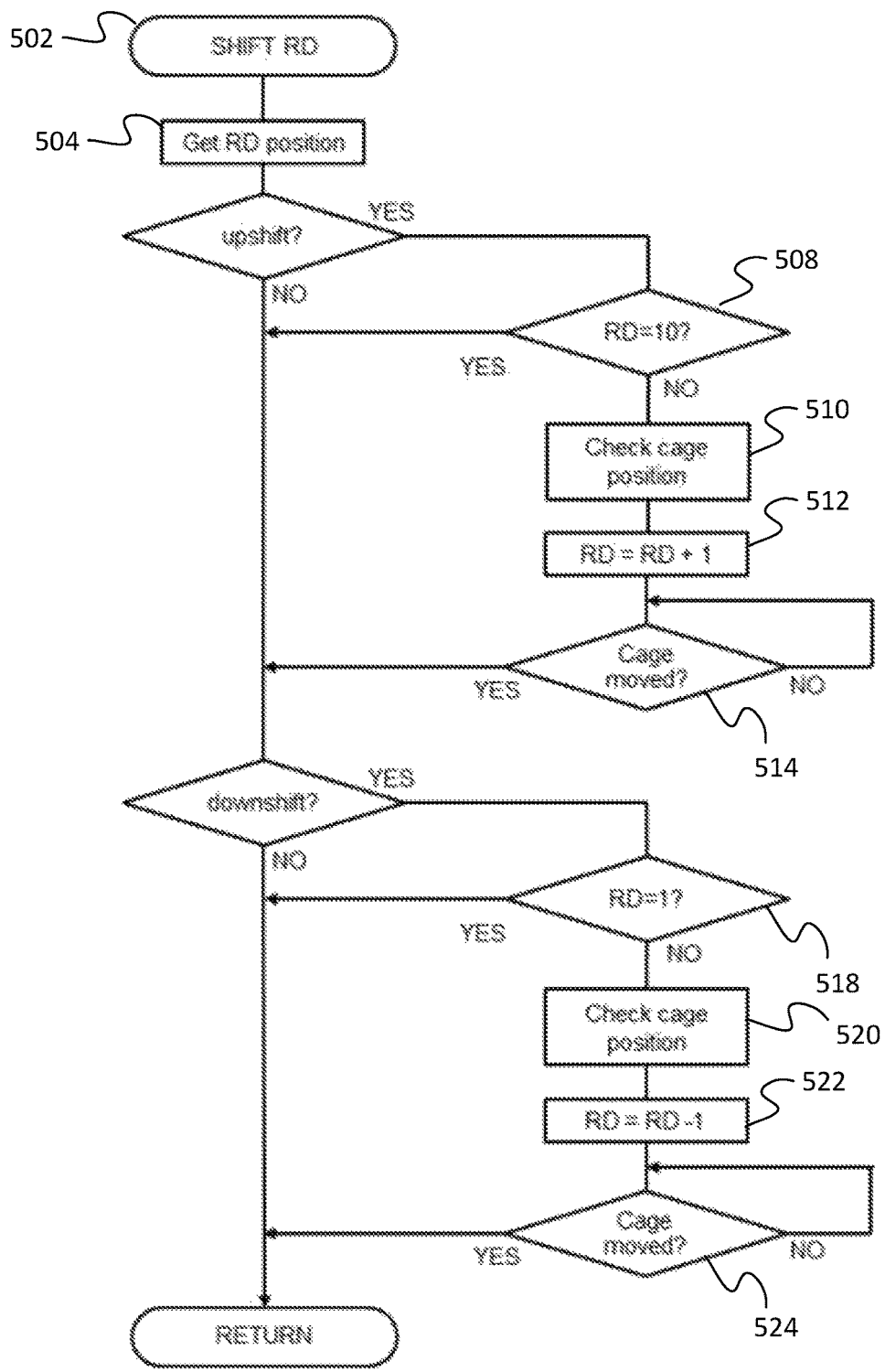

FIG. 8 illustrates a method for executing a shift command. The shift command is received at a rear derailleur (Block 502). An initial position of the rear derailleur is determined (Block 504), for example using the angle sensor described with respect to FIG. 5. The initial position may be determined using other techniques as well. For example, the current position may be electronically stored as a value in a table or array, and this value may be referenced.

The shift command is interpreted to be either a downshift or an upshift. If an upshift command is received, it is determined whether the initial position indicates that the chain is engaged with the smallest cog (Block 508) (e.g. RD=10 as a stored value). If the smallest cog is currently engaged, then the command is disregarded. If the smallest cog is not currently engaged, the cage or chain guide position of the rear derailleur may be checked, or determined (Block 510). The shift action may be executed by the rear derailleur, and a value for the rear derailleur position may be incremented (Block 512). A verification that the shift action was successfully executed may be accomplished by detecting and/or determining a different changed cage or chain guide position (Block 514). This may be enacted through a detection of a change from the cage or chain guide position determined prior to the executed shift action, such as by a signal provided by the angle sensor as described herein. If the shift action is not successfully completed, the action may be re-executed by the rear derailleur, and the verification may be repeated. This sequence may be repeated until a successfully executed shift action is verified.

If a downshift command is received, it is determined whether the initial position indicates that the chain is engaged with the largest cog (Block 518) (e.g. RD=1 as a stored value). If the largest cog is currently engaged, then the command is disregarded. If the largest cog is not currently engaged, the cage or chain guide position of the rear derailleur may be checked, or determined (Block 520). The shift action may be executed by the rear derailleur, and a value for the rear derailleur position may be adjusted accordingly (Block 522). A verification that the shift action was successfully executed may be accomplished by detecting and/or determining a different changed cage or chain guide position (Block 524). This may be enacted through a detection of a change from the cage or chain guide position determined prior to the executed shift action, such as by a signal provided by the angle sensor described above. If the shift action is not successfully completed, the action may be re-executed by the rear derailleur, and the verification may be repeated. This sequence may be repeated until a successfully executed shift action is verified.

Figure 9:
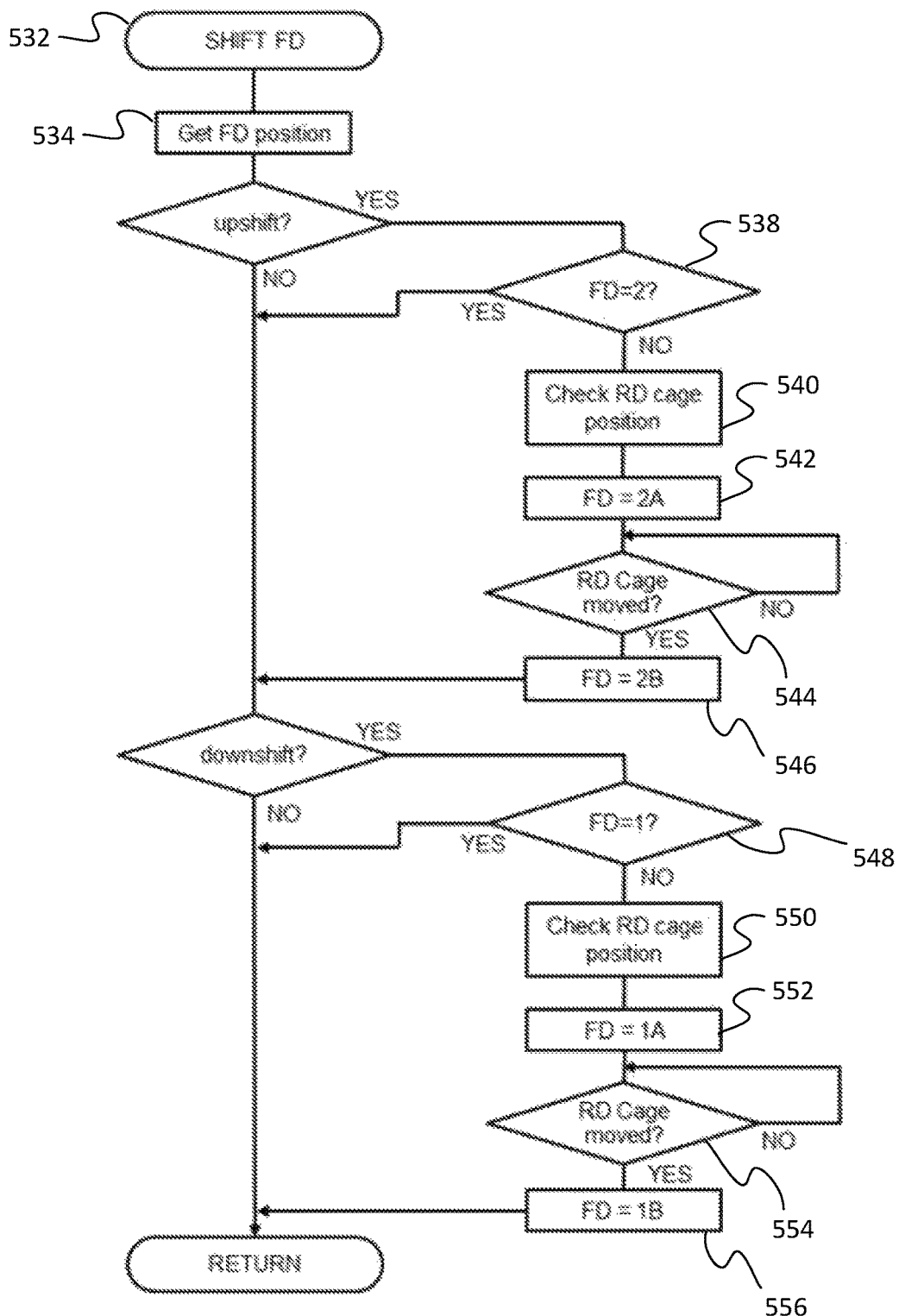

FIG. 9 illustrates another method for executing a shift command. In this embodiment, a shift action of the front derailleur may be verified using a sensor disposed within the rear derailleur. The shift command is received at a front derailleur (Block 532). An initial position of the front derailleur is determined (Block 534), for example using the angle sensor described with respect to FIG. 5. The initial position may be determined using other techniques as well. For example, the current position may be electronically stored as a value in a table or array, and this value may be referenced.

The shift command is interpreted to be either a downshift or an upshift. If an upshift command is received, it is determined whether the initial position indicates that the chain is engaged with the largest cog (Block 538) (e.g. FD=2 as a stored value). If the largest cog is currently engaged, then the command is disregarded. If the largest cog is not currently engaged, the cage or chain guide position of the rear derailleur may be checked, or determined (Block 540). The shift action may be executed by the front derailleur, and a value for the front derailleur position may be incremented (Block 542). In this embodiment, the value for the front derailleur position may include a verification coding. For example, an "A" suffix on the value may indicate an unverified value, whereas a "B" suffix on the value may indicate a verified value. The verification that the shift action was successfully executed may be accomplished by detecting and/or determining a different changed cage or chain guide position (Block 544). This may be enacted through a detection of a change from the rear derailleur cage or chain guide position determined prior to the executed shift action, such as by a signal provided by the angle sensor described above. If the shift action is not successfully completed, the action may be re-executed by the front derailleur, and the verification may be repeated. This sequence may be repeated until a successfully executed shift action is verified. When a successfully executed shift action is verified, the front derailleur value may be modified to indicate a verified value (Block 546).

If a downshift command is received, it is determined whether the initial position indicates that the chain is engaged with the smallest cog (Block 548) (e.g. RD=1 as a stored value). If the smallest cog is currently engaged, then the command is disregarded. If the smallest cog is not currently engaged, the cage or chain guide position of the rear derailleur may be checked, or determined (Block 550). The shift action may be executed by the front derailleur, and a value for the front derailleur position may be adjusted accordingly to indicate an unverified value (Block 552). A verification that the shift action was successfully executed may be accomplished by detecting and/or determining a different changed rear cage or chain guide position (Block 554). This may be enacted through a detection of a change from the cage or chain guide position determined prior to the executed shift action of the front derailleur, such as by a signal provided by the angle sensor described above. If the shift action is not successfully completed, the action may be re-executed by the front derailleur, and the verification may be repeated. This sequence may be repeated until a successfully executed shift action is verified. When a successfully executed shift action is verified, the front derailleur value may be modified to indicate a verified value (Block 556). For example, the front derailleur value may be modified to include a character designating a verified value, such as "B". Also, or alternatively, front derailleur positions may be verified by detecting and/or determining a different changed rear cage or chain guide position, as is described above.

In an embodiment, once a shift action is verified (Block 544 and/or Block 554), the front and/or rear derailleurs may be moved to a completed shift action position from an "overshift" or "undershift" position. For example, a shift action may be enacted by causing the front and/or rear derailleurs to move to overshift positions in which the respective derailleur is moved slightly beyond a typical operational position for the desired gearing combination. Similarly, the front and/or rear derailleurs to move to undershift positions in which the respective derailleur is moved short of a typical operational position for the desired gearing combination. Such a position being between the starting position and the typical operational position for the desired gearing combination. Once the shift action is verified the respective derailleurs may be moved to a completed shift action position, such as a typical operational position for the desired gearing combination. Movement to such overshift and/or undershift positions may aid in achieving a successful shift operation, and triggering movement to completed shift action positions based on verified cage or chain guide position can allow for smoother and more efficient gearing transitions.

FIG. 10 illustrates another method for executing a shift command. In this embodiment, a shift action of the rear derailleur may be verified and other components may be controlled based on a signal from a sensor disposed within the rear derailleur. The controlled component may be an electric motor, for example an electric drive motor for an electrically powered bicycle. In such electrically powered bicycles, it may be useful to reduce an input power and/or torque to the drivetrain during a shift action. The sensor disposed within the rear derailleur may be used to accomplish this, and other, power reductions.

The shift command is received at a rear derailleur (Block 562). An initial position of the rear derailleur is determined (Block 564), for example using the angle sensor described with respect to FIG. 5. The initial position may be determined using other techniques as well. For example, the current position may be electronically stored as a value in a table or array, and this value may be referenced.

The shift command is interpreted to be either a downshift or an upshift. If an upshift command is received, it is determined whether the initial position indicates that the chain is engaged with the smallest cog (Block 568) (e.g. RD=10 as a stored value). If the smallest cog is currently engaged, then the command is disregarded. If the smallest cog is not currently engaged, the cage or chain guide position of the rear derailleur may be checked, or determined (Block 570). Power to a component, for example a drive motor for an electrically powered bicycle, may be restricted, reduced, removed, and/or otherwise adjusted (Block 571). The shift action may be executed by the rear derailleur, and a value for the rear derailleur position may be incremented (Block 572). A verification that the shift action was successfully executed may be accomplished by detecting and/or determining a different changed cage or chain guide position (Block 574). This may be enacted through a detection of a change from the cage or chain guide position determined prior to the executed shift action, such as by a signal provided by the angle sensor described above. If the shift action is not successfully completed, the action may be re-executed by the rear derailleur, and the verification may be repeated. This sequence may be repeated until a successfully executed shift action is verified. If a successfully executed shift action is verified, power levels to the component may be restored (Block 576) as triggered by, or based on, the verification.

If a downshift command is received, it is determined whether the initial position indicates that the chain is engaged with the largest cog (Block 578) (e.g. RD=1 as a stored value). If the largest cog is currently engaged, then the command is disregarded. If the largest cog is not currently engaged, the cage or chain guide position of the rear derailleur may be checked, or determined (Block 580). Power to a component, for example a drive motor for an electrically powered bicycle, may be restricted, reduced, removed, and/or otherwise adjusted (Block 581). The shift action may be executed by the rear derailleur, and a value for the rear derailleur position may be adjusted accordingly (Block 582). A verification that the shift action was successfully executed may be accomplished by detecting and/or determining a different changed cage or chain guide position (Block 584). This may be enacted through a detection of a change from the cage or chain guide position determined prior to the executed shift action, such as by a signal provided by the angle sensor described above. If the shift action is not successfully completed, the action may be re-executed by the rear derailleur, and the verification may be repeated. This sequence may be repeated until a successfully executed shift action is verified. If a successfully executed shift action is verified, power levels to the component may be restored (Block 586) as triggered by, or based on, the verification.

FIG. 11 illustrates another method for executing a shift command. In this embodiment, a shift action of the rear derailleur may be verified and other components may be controlled based on a signal from a sensor disposed within the rear derailleur. The controlled component may be an electronically controlled derailleur damper, for example a derailleur movement resisting device as described in U.S. Pat. No. 8,602,929. In such electronically controlled damper derailleurs, it may be useful to reduce dampening during a shift action, then resume dampening levels after a shift action. The sensor disposed within the rear derailleur may be used to accomplish this, and other, dampening actions.

The shift command is received at a rear derailleur (Block 602). An initial position of the rear derailleur is determined (Block 603), for example using the angle sensor described with respect to FIG. 5. The initial position may be determined using other techniques as well. For example, the current position may be electronically stored as a value in a table or array, and this value may be referenced.

The shift command is interpreted to be either a downshift or an upshift. If an upshift command is received, it is determined whether the initial position indicates that the chain is engaged with the smallest cog (Block 604) (e.g. RD=10 as a stored value). If the smallest cog is currently engaged, then the command is disregarded. If the smallest cog is not currently engaged, the cage or chain guide position of the rear derailleur may be checked, or determined (Block 610). Dampening forces of a damper may be restricted, reduced, removed, and/or otherwise adjusted (Block 611). The shift action may be executed by the rear derailleur, and a value for the rear derailleur position may be incremented (Block 612). A verification that the shift action was successfully executed may be accomplished by detecting and/or determining a different changed cage or chain guide position (Block 614). This may be enacted through a detection of a change from the cage or chain guide position determined prior to the executed shift action, such as by a signal provided by the angle sensor described above. If the shift action is not successfully completed, the action may be re-executed by the rear derailleur, and the verification may be repeated. This sequence may be repeated until a successfully executed shift action is verified. If a successfully executed dampening levels of the component may be restored or otherwise adjusted (Block 616) as triggered by, or based on, the verification.

If a downshift command is received, it is determined whether the initial position indicates that the chain is engaged with the largest cog 618 (e.g. RD=1 as a stored value). If the largest cog is currently engaged, then the command is disregarded. If the largest cog is not currently engaged, the cage or chain guide position of the rear derailleur may be checked, or determined (Block 620). Dampening forces of a damper may be restricted, reduced, removed, and/or otherwise adjusted (Block 621). The shift action may be executed by the rear derailleur, and a value for the rear derailleur position may be adjusted accordingly (Block 622). A verification that the shift action was successfully executed may be accomplished by detecting and/or determining a different changed cage or chain guide position (Block 624). This may be enacted through a detection of a change from the cage or chain guide position determined prior to the executed shift action, such as by a signal provided by the angle sensor described above. If the shift action is not successfully completed, the action may be re-executed by the rear derailleur, and the verification may be repeated. This sequence may be repeated until a successfully executed shift action is verified. If a successfully executed dampening levels of the component may be restored or otherwise adjusted (Block 626) as triggered by, or based on, the verification.

In an embodiment, a gear change mechanism for a bicycle operated with a plurality of sprockets driven by a chain includes a base member configured for mounting to the bicycle, a link mechanism pivotably connected to the base member, a moveable member pivotably mounted to the link mechanism such that the moveable member is movable in an axial direction relative to the base member, a chain guide configured to engage and guide the chain, and a sensor configured to determine an angle of the chain guide relative to the moveable member. In this embodiment, the chain guide may include a pivot member rotatably mounted to the moveable member and configured to rotate about a first axis of rotation, a first wheel configured to interface with the chain and rotate about a second axis of rotation, and a positioning member extending between and connecting the pivot member and the first wheel. In an embodiment, the positioning member may be rigidly connected to the pivot member. In an embodiment the chain guide may include a second wheel configured to interface with the chain and rotate about a third axis of rotation. In an embodiment, the third axis of rotation is the same as the first axis of rotation. In an embodiment, the sensor is configured to determine an angle of rotation of the pivot member about the first axis of rotation. In an embodiment, the sensor is configured to detect an angular position of a magnet. In an embodiment, the sensor is a magnetic rotary encoder. In an embodiment, the sensor is mounted on the moveable member or the pivot member. In an embodiment, the magnet is disposed on the other of the pivot member or the movable member. In an embodiment, the magnet is disposed on an end of the pivot member. In an embodiment the chain guide includes a biasing device coupled with the chain guide and configured to maintain a tension in the chain. In an embodiment, the biasing device is fixably attached to the moveable member and the chain guide. In an embodiment, the gear change mechanism includes a processor in operative communication with the sensor, wherein the sensor is further configured to communicate a signal indicative of the angle. In an embodiment, the gear change mechanism includes a motor operatively coupled to the link mechanism to move the movable member along the axial direction, and wherein the processor is configured to provide a command signal to the motor in response to the signal indicative of the angle.

In an embodiment, a method of drivetrain management for a bicycle driven by a chain operating over a plurality of sprockets, involves determining, with a sensor, an angle of a tensioner chain contact, the tensioner chain contact configured to maintain a tension in the chain, and detecting, by a processor in communication with the sensor, a change in the angle of the tensioner chain contact. In an embodiment, the tensioner chain contact is a tensioner wheel having a center disposed a distance from a pivot member having a first axis of rotation, the tensioner wheel being configured to rotate about the first axis of rotation and a second axis of rotation to interface with the chain so as to maintain a tension in the chain. In an embodiment, the tensioner wheel is connected to the pivot member with a rigid member, and the determining the angle of the tensioner wheel comprises measuring, with the sensor, a rotational orientation of the pivot member. In an embodiment, the measuring the rotational orientation of the pivot member involves measuring a rotational orientation of a magnet attached to the pivot member. In an embodiment, the measuring the rotational orientation of the magnet attached to the pivot member involves measuring a rotational orientation of the magnet attached to a distal end of the pivot member. In an embodiment, a method involves communicating, by the processor, a control signal to an electric motor in response to the detecting the change in the position of the tensioner chain contact.

In an embodiment, a chain tensioner for a bicycle operated with a plurality of sprockets driven by a chain includes a tensioner mount configured to be attached to a bicycle, a pivot member rotatably mounted to the tensioner mount and configured to rotate about an axis of rotation, and a chain interface structure, such as a chain guide. The chain interface structure may include a chain interface component, such as a wheel, and a positioning member extending between and connecting the pivot member and the chain interface component. The chain tensioner may also include a biasing device coupled with the chain interface component and configured to maintain a tension in the chain, and a sensor configured to determine an angle of the chain interface structure relative to the tensioner mount. In an embodiment the chain interface component is a first wheel configured to rotate about a second axis of rotation, and the chain tensioner structure may also include a second wheel configured to interface with the chain and rotate about a third axis of rotation. In an embodiment, the third axis of rotation is the same as the first axis of rotation. In an embodiment, the sensor is configured to determine an angle of rotation of the pivot member about the first axis of rotation. In an embodiment, the sensor is configured to detect an angular position of a magnet. In an embodiment, the sensor is a magnetic rotary encoder. In an embodiment, the sensor is mounted on the tensioner mount or the pivot member. In an embodiment, the magnet is disposed on the other of the pivot member or the tensioner mount. In an embodiment, the magnet is disposed on an end of the pivot member. In an embodiment the biasing device is fixably attached to the tensioner mount and the chain tensioner structure. In an embodiment, a gear change mechanism includes a processor in operative communication with the sensor, wherein the sensor is further configured to communicate a signal indicative of the angle. In an embodiment, the gear change mechanism includes a motor operatively coupled to the link mechanism to move the movable member along the axial direction, and wherein the processor is configured to provide a command signal to the motor in response to the signal indicative of the angle.

FIG. 12 is a block diagram of an exemplary control system 40 for a bicycle. The control system 40 may be used alone to communicate with and control bicycle components, or the control system 40 may be used in conjunction with at least one other control system for components of the bicycle, such as a primary control system that may include alternative control devices such as brake lever housing integrated shift controllers. The system 40 includes at least one control unit 28. The control unit 28 includes a processor 20, a memory 10, component communication interface 80, a user interface 82, a power supply 84, and a control device interface 90. Additional, different, or fewer components are possible for the control unit 28. For example, the user interface 82 may not be included in a control unit 28. Also, components may be combined. For example, in an embodiment the communication interface 80 and the control device interface 90 may be combined. In this embodiment shift units 26 and sensor(s) 200 may communicate using a same interface, which may be the control device interface 90 or the communication interface 80. In an embodiment, the control unit 28 and sensor(s) 200 are integrated with a rear derailleur 36, for example as is described with respect to FIGS. 3 and 4.

The processor 20 may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the control unit 28, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply, which may be stored internal to the control unit 28, or stored external to the control unit 28 and communicated to the control unit 28 through a power conductive cable. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

The communication interface 80 provides for data and/or signal communication from one or more sensors 200 to the control unit 28. The communication interface 80 communicates using wired and/or wireless communication techniques. For example, the communication interface 80 communicates with the sensors 200 using a system bus, or other communication technique.

The user interface 82 may be one or more buttons, keypad, keyboard, mouse, stylus pen, trackball, rocker switch, touch pad, voice recognition circuit, or other device or component for communicating data between a user and the control unit 28. The user interface 82 may be a touch screen, which may be capacitive or resistive. The user interface 82 may include a liquid crystal display ("LCD")

panel, light emitting diode ("LED"), LED screen, thin film transistor screen, or another type of display. The user interface 82 may also include audio capabilities, or speakers.

In an embodiment, the user interface 82 includes one or more buttons and an LED indicator. The buttons are used to communicate commands to the control unit 28, and the LED indicator lights to indicate input of the commands or other actions.

The control device interface 90 is configured to send and/or receive data such as control signals and/or commands to and/or from bicycle components such as the front gear changer 30 and/or the shift units 26. The component control device interface 90 communicates the data using any operable connection. An operable connection may be one in which signals, physical communications, and/or logical communications may be sent and/or received. An operable connection may include a physical interface, an electrical interface, and/or a data interface. The control device interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, the methods described herein may be implemented with software programs executable by a computer system, such as the control unit 28. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a control unit 28 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A gear change mechanism for a bicycle operated with a plurality of sprockets driven by a chain, the gear change mechanism comprising:
    a base member configured for mounting to the bicycle;
    a link mechanism pivotably connected to the base member;
    a moveable member pivotably mounted to the link mechanism such that the moveable member is movable in an axial direction relative to the base member;
    a chain guide configured to engage and guide the chain; and
    a sensor configured to determine an angle of the chain guide relative to the moveable member.

2. The gear change mechanism of claim 1, wherein the chain guide comprises:
    a pivot member rotatably mounted to the moveable member and configured to rotate about a first axis of rotation;
    a first wheel configured to interface with the chain and rotate about a second axis of rotation; and
    a positioning member extending between and connecting the pivot member and the first wheel.

3. The gear change mechanism of claim 2, wherein the positioning member is rigidly connected to the pivot member.

4. The gear change mechanism of claim 3, wherein the chain guide further comprises a second wheel configured to interface with the chain and rotate about a third axis of rotation.

5. The gear change mechanism of claim 4, wherein the third axis of rotation is the same as the first axis of rotation.

6. The gear change mechanism of claim 2, wherein the sensor is configured to determine an angle of rotation of the pivot member about the first axis of rotation.

7. The gear change mechanism of claim 2, wherein the sensor is configured to detect an angular position of a magnet.

8. The gear change mechanism of claim 7, wherein the sensor is a magnetic rotary encoder.

9. The gear change mechanism of claim 7, wherein the sensor is mounted on the moveable member or the pivot member.

10. The gear change mechanism of claim 9, wherein the magnet is disposed on the other of the pivot member or the movable member.

11. The gear change mechanism of claim 9, wherein the magnet is disposed on an end of the pivot member.

12. The gear change mechanism of claim 1, wherein the chain guide further comprises a biasing device coupled with the chain guide and configured to maintain a tension in the chain.

13. The gear change mechanism of claim 12, wherein the biasing device is fixably attached to the moveable member and the chain guide.

14. The gear change mechanism of claim 1, further comprising:
    a processor in operative communication with the sensor, wherein the sensor is further configured to communicate a signal indicative of the angle.

15. The gear change mechanism of claim 14, further comprising:
    a motor operatively coupled to the link mechanism to move the movable member along the axial direction, and wherein the processor is configured to provide a command signal to the motor in response to the signal indicative of the angle.

16. A method of drivetrain management for a bicycle driven by a chain operating over a plurality of sprockets, the method comprising:
   determining, with a sensor, an angle of a tensioner chain contact relative to a tensioner mount, the tensioner chain contact configured to maintain a tension in the chain; and
   detecting, by a processor in communication with the sensor, a change in the angle of the tensioner chain contact.

17. The method of claim 16, wherein the tensioner chain contact is a tensioner wheel having a center disposed a distance from a pivot member having a first axis of rotation, the tensioner wheel being configured to rotate about the first axis of rotation and a second axis of rotation to interface with the chain so as to maintain a tension in the chain.

18. The method of claim 17, wherein the tensioner wheel is connected to the pivot member with a rigid member, and the determining the angle of the tensioner wheel comprises measuring, with the sensor, a rotational orientation of the pivot member.

19. The method of claim 18, wherein the measuring the rotational orientation of the pivot member comprises measuring a rotational orientation of a magnet attached to the pivot member.

20. The method of claim 19, wherein the measuring the rotational orientation of the magnet attached to the pivot member comprises measuring a rotational orientation of the magnet attached to a distal end of the pivot member.

21. The method of claim 16, further comprising:
   communicating, by the processor, a control signal to an electric motor in response to the detecting the change in the position of the tensioner chain contact.

22. A chain tensioner for a bicycle operated with a plurality of sprockets driven by a chain, the chain tensioner comprising:
   a tensioner mount configured to be attached to a bicycle;
   a pivot member rotatably mounted to the tensioner mount and configured to rotate about an axis of rotation;
   a chain interface structure comprising:
      a chain interface component configured to maintain contact with the chain, and
      a positioning member extending between and connecting the pivot member and the chain interface component;
   a biasing device coupled with the chain interface structure and configured to maintain a tension in the chain; and
   a sensor configured to determine an angle of the chain interface structure relative to the tensioner mount.

\* \* \* \* \*